United States Patent
Friberg et al.

(10) Patent No.: US 9,502,157 B2
(45) Date of Patent: Nov. 22, 2016

(54) POWER CABLE ASSEMBLY DEVICE AND A POWER CABLE PROVIDED WITH SUCH A DEVICE

(71) Applicant: ABB Schweiz AG, Baden (CH)

(72) Inventors: Peter Friberg, Karlskrona (SE);
Flemming Krogh, Jämjö (SE); Claes Sonesson, Rödeby (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/787,183

(22) PCT Filed: Jun. 19, 2013

(86) PCT No.: PCT/EP2013/062818
§ 371 (c)(1),
(2) Date: Oct. 26, 2015

(87) PCT Pub. No.: WO2014/202140
PCT Pub. Date: Dec. 24, 2014

(65) Prior Publication Data
US 2016/0111185 A1    Apr. 21, 2016

(51) Int. Cl.
*G02B 6/44* (2006.01)
*H01B 9/02* (2006.01)
*H01B 11/22* (2006.01)
*H01B 3/44* (2006.01)
*H01B 9/00* (2006.01)

(52) U.S. Cl.
CPC ............. *H01B 9/027* (2013.01); *G02B 6/4407* (2013.01); *G02B 6/4416* (2013.01); *G02B 6/4419* (2013.01); *H01B 3/443* (2013.01); *H01B 9/005* (2013.01); *H01B 11/22* (2013.01); *G02B 6/4427* (2013.01); *G02B 6/4459* (2013.01)

(58) Field of Classification Search
None
See application file for complete search history.

(56) References Cited

U.S. PATENT DOCUMENTS

| | | | | |
|---|---|---|---|---|
| 4,705,353 A | * | 11/1987 | Wagoner | G02B 6/441 385/101 |
| 2005/0217890 A1 | * | 10/2005 | Efraimsson | H01B 7/288 174/105 R |
| 2010/0122844 A1 | * | 5/2010 | Efraimsson | G02B 6/4422 174/70 C |

(Continued)

FOREIGN PATENT DOCUMENTS

DE    195 08 888 A1    9/1996
SE    530 277 C2    4/2008

OTHER PUBLICATIONS

Machine translation of JP 2007-73519 A, retrieved May 19, 2016.*

*Primary Examiner* — Mike Stahl
(74) *Attorney, Agent, or Firm* — Birch, Stewart, Kolasch & Birch, LLP

(57) ABSTRACT

A power cable assembly device adapted to be arranged in the spaces between neighboring power cores of a power cable, includes an extruded profiled body made of a polymer material and adapted to the cross-sectional shape and elongation of the power cable, the profiled body including a chamber and defining a slit to the chamber, the chamber being adapted to receive a fiber optic cable via the slit. Substantially the whole surface of the profiled body inside the chamber, the surface of the profiled body defining the slit, and the surface of at least a region outside the profiled body extending from the slit and away from the slit is provided with a layer of semi-conductive material.

20 Claims, 5 Drawing Sheets

(56) References Cited

U.S. PATENT DOCUMENTS

| | | | |
|---|---|---|---|
| 2011/0200289 A1* | 8/2011 | Sorimachi | H01B 7/041 385/101 |
| 2012/0145453 A1* | 6/2012 | Temple | H01B 7/185 174/70 C |
| 2012/0205137 A1* | 8/2012 | Fjellner | F16L 53/007 174/116 |
| 2016/0070080 A1* | 3/2016 | Krogh | G02B 6/4417 385/101 |
| 2016/0085043 A1* | 3/2016 | Melin | G02B 6/4417 385/101 |

* cited by examiner

POWER CABLE ASSEMBLY DEVICE AND A POWER CABLE PROVIDED WITH SUCH A DEVICE

TECHNICAL FIELD

The present invention relates to a power cable assembly device adapted to be arranged in the spaces between neighbouring power cores of a power cable, comprising an extruded profiled body made of a polymer material and adapted to the cross-sectional shape and elongation of the power cable, said profiled body comprising a chamber and defining a slit to said chamber, said chamber being adapted to receive a fibre optic cable via said slit.

It also relates to a power cable comprising such a power cable assembly device.

BACKGROUND OF THE INVENTION

When putting a power cable in the ground, or on the sea floor, it is often practical to add a fibre optic cable in a space between the power cores.

A power cable assembly device, a power cable and a tool is known from SE-C2-530 277, respectively. The known assembly device however suffers from inefficient equalisation of electric potential.

According to DE-A1-195 08 888 A1, the fibre optic cable is put inside a metal tubing placed at two of the power cores with the intention to provide contact between the metal tubing and the outer conductive plastic material of the power core, in order to equalize the electric potential between the power core and the metal tubing.

OBJECT OF THE INVENTION

The object is to provide a power cable assembly device and a power cable, which is possible to test on land or with insufficient contact with sea-water, even if not correctly earthed, without risking that the fibre optic cable is damaged when testing or operating the power cable.

SUMMARY OF THE INVENTION

This object has been achieved by the assembly device and the power cable, further comprising the features that, substantially the whole surface of the profiled body inside the chamber and the surface of the profiled body defining the slit, and at least a region outside the profiled body extending from the slit and away from the slit is provided with a layer of semi-conductive material.

Hereby is achieved an improved equalisation of the electric potential between the power cores and the semi-conductive outer layer of the power core and the semi-conductive outer layer of the fibre optic cable.

Furthermore is achieved a less expensive production method of the assembly device, since less semi-conductive material needs to be used.

In particular, the cross-section of the profiled body includes a first wall, a second wall and a third wall,
said first wall being convex and having first and second opposite end portions,
said second wall being concave and having third and fourth opposite end portions,
said third wall being concave and having fifth and sixth end portions,
the third end portion of said second wall being connected to said first end portion of said first wall,
the fifth end portion of said third wall being connected to said second end portion of the first wall,
the first wall being adapted to face a jacket of the power cable,
said a second and a third walls being adapted to face a pair of neighbouring power cores,
wherein the fourth end portion of the second wall and the sixth end portion of the third wall define together a slit to a chamber between said first, second and third walls, said slit extending in the elongation of the profile for allowing introduction of a fibre optic cable into said chamber. Hereby, the profiled body is further defined.

Suitably, the cross-section of the chamber is substantially annular. Hereby, an optimal shape of the chamber is achieved. Of course, the annular chamber could be polygonal rather than circular.

Suitably, also the semi-conductive material of the layer comprises a polymer material. A mixture of PE and an additive would be preferable, even though a mixture of PVC and an additive would be possible. In particular, said additive could be carbon black.

Hereby is achieved a cost-efficient semi-conductive material with good mechanical and blending properties to the non-conductive material.

Preferably, the thickness of said layer is in the range 0.01-0.5 mm, more preferably 0.05-0.35 mm, even more preferably 0.1-0.3 mm, even more preferably 0.15-0.25 mm, most preferably 0.2 mm. Hereby, a low consumption of the additive is achieved during manufacture of the assembly device. Furthermore, a layer adapted for the voltage of the power cable is achieved.

Suitably, said elongated slit is closed in an assembled state. Hereby is achieved a power cable assembly device with high mechanical stability. In such a case, the diameter of the chamber is in the range 11-25 mm, more preferably 13-23 mm. In this case, the diameter of the chamber can be chosen without dependency of the slit width.

Alternatively, the slit is open in an assembled state, and the slit width, i.e. the distance between the fourth end portion of the second wall and the sixth end portion of the third wall defining the slit is in the range 1 mm-13 mm, more preferably 3-11 mm, even more preferably 4-6 mm, most preferably 5 mm. Hereby the insertion of a fibre optic cable is made allowed to be performed readily and easily. The slit width should be chosen such that the diameter of the fibre optic cable including cover is 1-5 mm larger than the slit width.

Alternatively, the diameter of the chamber is in the range 11-25 mm, more preferably 12-23 mm.

The combination of the fact that the material used is watertight and that the slit is closed, no or only small amounts of water will circulate in the chamber, which makes the need for an efficient equalisation of the electric potential even more important, since no contribution for this purpose by water is achieved.

Preferably, the wall thickness of either or all of the second wall, the third wall and a wall defining the chamber has a thickness in the range of 2-6 mm, more preferably 2.5-4 mm, most preferably 3 mm.

Suitably, the concavity of the outer surface of the second and the third walls, respectively, is adapted to the number of power cores and the diameter of the power cores including insulation. Hereby, a tight fit will be achieved between the assembly profile and neighbouring power cores, and the power cores and the profiles will form a power cable with a substantially circular cross-section with high mechanical stability.

The convexity of the outer surface of the first wall is suitably adapted to an imaginary circle between a peripheral point of each power core in relation to the diametrical centre point of the power cable. Hereby is achieved a power cable with large form stability when assembled, i.e. the cross-section of the assembled power cable with be substantially circular also at the high pressures on the bottom of sea bottom at large depths.

Suitably, the number of power cores is three and the number of power cable assembly devices is three. The diameter of each power core is in the range of 30-140 mm, more preferably 40-130 mm.

Further, the invention relates to a power cable comprising a plurality of power cable assembly devices according to the invention as defined herein, said power cable assembly devices arranged in the spaces between neighbouring power cores, at least one of said power cord assembly devices containing a fibre optic cable introduced via said slit.

Further, the first wall faces a jacket of the power cable, said second and third walls face a pair of neighbouring power cores, and at least one of said assembly devices containing said fibre optic cable.

Suitably, the concavity of the second and third walls, respectively, is adapted to the number of power cores and the diameter of the power cores in the power cable.

In addition it is also referred to a power cable, wherein the convexity of the first wall is adapted to an imaginary circle between a peripheral point of each power core in relation to the diametrical centre point of the power cable.

Suitably, the number of power cores is three and the number of power cable assembly devices is three, and the diameter of each power core is in the range 40-140 mm, more preferably 50-130 mm.

DRAWING SUMMARY

In the following, the invention will be described in more detail by reference to the enclosed drawings, in which FIG. 1 is a cross-section of a power cable assembly device according to a first embodiment of the invention;

DETAILED DESCRIPTION

Figure 1:
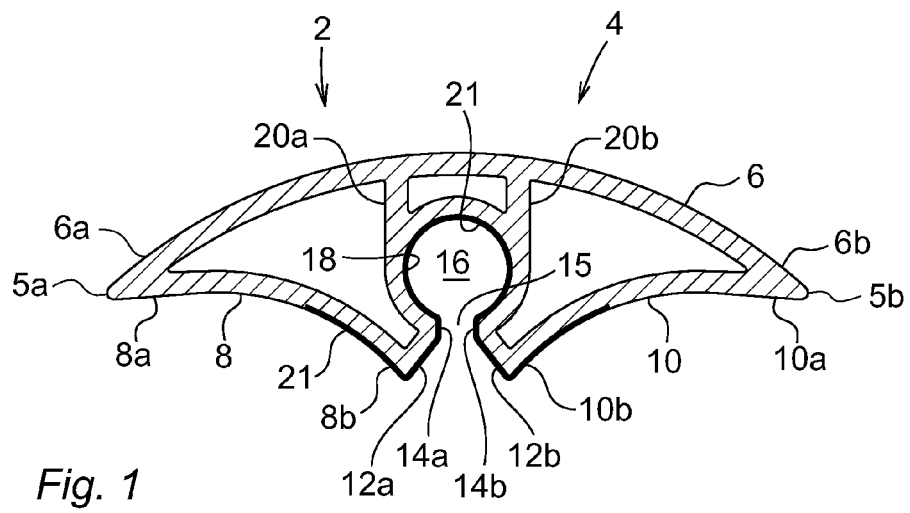

FIG. 1 shows a power cable assembly device 2 in the form of an extruded profiled body 4 with a first wall 6, a second wall 8, a third wall 10. The first wall 6 is convex while the second and third walls 8, 10 are concave, the reason for which will be discussed farther below. The cross-section of the profiled body has first and second end portions 5a, 5b, opposite to one another.

The first wall 6 has a first end 6a and a second end 6b. Likewise, the second wall 8 has a first end 8a and a second end 8b, and the third wall 10 has a first end 10a and a second end 10b. The first end 6a of the first wall 6 is connected to the first end 8a of the second wall at the first end 5a, while the second end 6b of the first wall 6 is connected to the first end 10a of the third wall 10 at the second end of the profiled body 4.

The second end 8b of the second wall 8 continues to a first angled transition 12a and further to a first radial transition 14a. Likewise, the second end 10b of the third wall 10 continues to a second angled transition 12b and further to a second radial transition 14b.

The first and second angled transitions 12a, 12b are converging towards the first and second radial transitions 14a, 14b, the latter being substantially parallel to one another and thus substantially radial to the convex first wall 6.

According to this embodiment, the first and second radial transitions 14a, 14b are arranged at a distance from one another, defining an open slit 15.

Inside the profiled body 4, a chamber 16 defined by a substantially annular wall 18 is arranged. The annular wall 18 extends from the first radial transition 14a to the second radial transition 14b. A pair of reinforcement members 20a, 20b are arranged between the annular wall 18 and the first wall 6. Of course, the number of reinforcement members could be less than two, i.e. one or zero (i.e. leaving an open space between the annular wall 18 and the first wall 6), or more than two, i.e. three, four, five or even more, depending on the space available between the circumferential walls.

The assembly device 2 is made by extrusion of a polymer material, such as PE (e.g. MDPE or HDPE) or PVC and may have a length of several kilometres.

The annular wall 18, the first and second radial transitions 14a, 14b, the first and second angled transitions 12a, 12b and a part of the second and third walls 8, 10 are provided with a thin layer 21 of a semi conductive material.

The thin layer 21 of semi-conductive material is produced by mixing an additive, such as carbon black, and a polymer material (such as MDPE, HDPE or PVC). The polymer material for the profiled body as such and the semi-conductive material for the thin layer 21 are then supplied via different mouthpieces during a co-extrusion process, the supply of the semi-conductive material thus forming the thin layer 21, while the supply of the polymer material forming the rest of the profiled body 4.

Alternatively, the semi-conductive layer could be in the form of a tape, applied by means of an adhesive to the surface.

Of course, surface of the whole lateral extension of the second and third walls 8, 10 could be provided with the thin layer 21 of a semi-conductive material.

At least the second and third walls 8, 10 have a thickness in the range 2-6 mm, more preferably 2.5-4 mm, most preferably 3 mm, and thin layer 21 of the semi-conductive material is in the range 0.01-0.5 mm, more preferably 0.05-0.35 mm, even more preferably 0.1-0.3 mm, even more preferably 0.15-0.25 mm, most preferably 0.2 mm.

The function of the layer 21 of semi-conductive material will be explained farther below.

Figure 2:
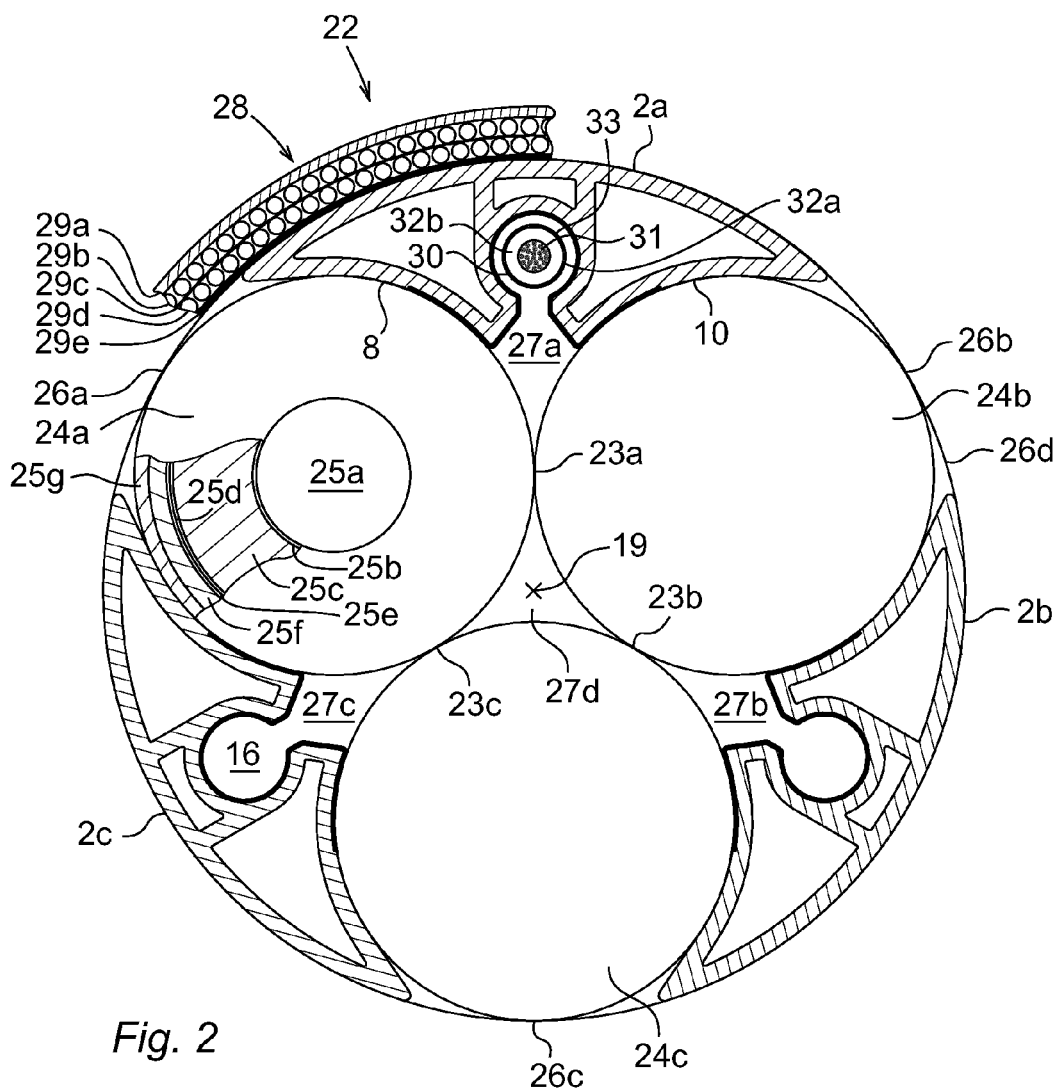
FIG. 2 is a cross-section of the interior of a power cable provided with the power cable assembly body shown in FIG. 1.

FIG. 2 shows the interior of a power cable 22 provided with three neighbouring first, second and third power cores 24a, 24b, 24c, each provided—from the centre to the periphery—with a conductor 25a, a central semi-conductive layer 25b, insulation 25c, an intermediate semi-conductive layer 25d, a layer of swelling material 25e, a metal screen 25f made of lead and a peripheral semi-conductive mantle 25g.

The central and intermediate semi-conductive layers 25b, 25d form a smooth surface which controls the electric field strength. The swelling material 25e tightens against water in case the lead screen 25f would start leaking.

Each power core 24a, 24b, 24c has a peripheral point 26a, 26b, 26c in relation to the diametrical centre 19 of the power cable 22, i.e. in the central space 27d. The three peripheral points 26a, 26b, 26c form together in relation to the centre point 19 an imaginary circle 26d.

The first and second power cores 24a, 24b touch one another at a contact point 23a and define a peripheral space 27a together with the imaginary circle 26d. Likewise, the second and third power cores 24b, 24c have a contact point 23b and define a second peripheral space 27b together with the imaginary circle 26d and the third and first power cores 24c and 24a have a contact point 23c and define a third peripheral space 27c together with the imaginary circle 26d. The first, second and third power cores 24a, 24b, 24c define between the contact points 23a, 23b, 23c a central space 27d.

In the peripheral space 27a, a first assembly device 2a is provided. Likewise, a second assembly device 2b is arranged in the second peripheral space 27b, and a third assembly device 2c is arranged in the third peripheral space 27c.

The power cable is provided with a jacket 28 to keep the power cores 24a, 24b, 24c and the assembly devices 2a, 2b, 2c together as one unit and to keep the circular cylindrical shape and mechanical protection. The jacket 28 comprises—from the periphery towards the centre point 19—two layers 29a of yarn made of polypropylene (PP), a first steel wire armour layer 29b, a first soft layer 29c of laying bands, a second steel wire armour layer 29d, a second soft layer 29e of laying bands.

As can be understood from FIG. 2, the concavity of the outer surface of the second and third walls 8, 10 of each assembly device 2a, 2b, 2c depends on the diameter of the power cores 24a, 24b, 24c. In the same manner, the convexity of the outer surface of the first wall 6 of each assembly device 2a, 2b, 2c depends on the radius of curvature of the imaginary circle 26d.

An elongated a fibre optic cable 30 comprises a fibre optic wave conductor 31, i.e. a bundle of optical fibres inside a metal tubing 32a together with a mass 32b, such as a gel. The metal tubing 32a is covered with a layer of semi-conductive layer 33. The fibre optic cable 30 is put inside the chamber 16 of assembly device 2a. In order to avoid building up of an electric potential between the fibre optic cable 30 and the power core 24a and/or 24b, it is important that a sufficient contact is established between the semi-conductive layer 33 of the metal tubing 32a of the fibre optic cable 30 and the peripheral semi-conductive mantle 25g of the core. This is performed during assembly first by introducing the fibre optic cable 30 into the chamber 16, and then by putting the concave second and third walls 8, 10 of the assembly device 2a against the power cores 24a and 24b, such that the thin layer 21 of semi-conductive material of the second and third walls 8, 10 is allowed to contact the peripheral semi-conductive mantle 25g. Owing to the fact that the thin layer 21 of semi-conductive layer extends from the second wall 8, to the first angled transition 12a, continuing via the first radial transition 14a to and about the annular wall 18 and further to the second radial transition 14b and continuing via the second angular transition 12b to the third wall 10, a contact to the thin layer 21 semi-conductive will be established disregarding which part of the annular wall 18 is contacted by the semi-conductive layer 33 of the metal tubing 32a of the fibre optic cable 30. Electric contact is also established between the peripheral semi-conductive mantle 25g of each of the power cores 24a and 24b via contact point 23a.

Consequently, the risk for a building up of an electric potential between the fibre optic cable 30 and the power cores 24a and/or 24b or any other surrounding metallic parts, such as the armour layers is avoided.

Of course, this relates correspondingly to the case when a fibre optic cable is put inside the chamber of the assembly devices 2b and/or 2c.

Figure 3:
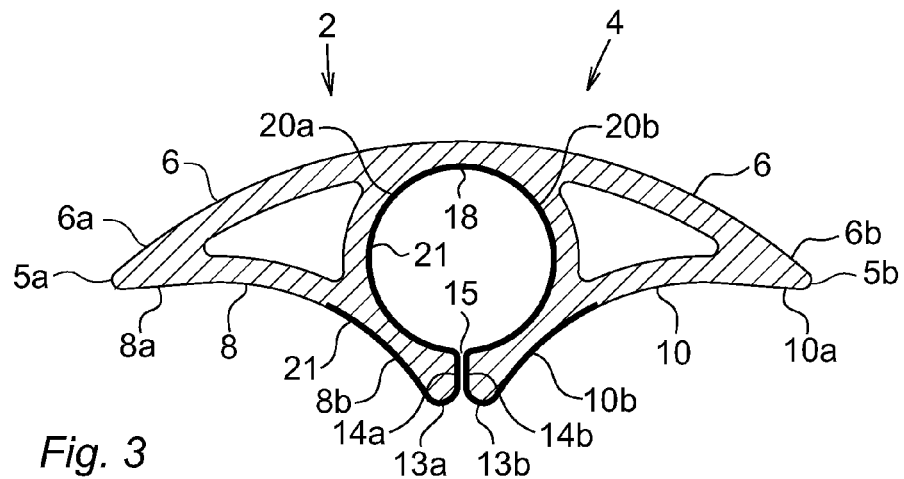
FIG. 3 is a cross-section of a power cable assembly body according to a second embodiment of the invention.

FIG. 3 shows a second embodiment of an assembly device 2 made by extrusion of a polymer material, such as PE (e.g. MDPE or HDPE) or PVC.

Also in this embodiment, the first wall 6 of the profiled body 4 is convex and has first and second ends 6a, 6b; the second wall 8 is concave and has first and second ends 8a, 8b; and the third wall 10 is concave and has first and second ends 10a, 10b. The first, second and third walls are connected to one another as described in connection with FIG. 1 above.

However according to this embodiment, the second end 8b of the second wall 8 continues to a first curved transition 13a and further to a first radial transition 14a. Likewise, the second end 10b of the third wall 10 continues to a second curved transition 13b and further to a second radial transition 14b. Also in this embodiment the first and second radial transitions 14a, 14b are substantially parallel to one another and are thus substantially radial to the convex first wall 6.

However, according to this embodiment, the first and second radial transitions 14a, 14b are arranged without distance from one another, i.e. the slit 15 is closed at least when mounted, even though the slit for clarity reasons have been shown to be somewhat open.

Also in this embodiment, the annular wall 18 defining the chamber 16 extends from the first radial transition 14a to the second radial transition 14b. However, no further reinforcement members are needed. Instead, the annual wall 18 is partly constituted by the first wall 6.

According to this embodiment, the annular wall 18, the first and second radial transitions 14a, 14b, the first and second curved transitions 13a, 13b and a part of the second and third walls 8, 10 are provided with a thin layer of a semi-conductive layer 21, such as carbon black mixed into a polymer material (e.g. PE or PVC) before the co-extrusion process.

Also in this embodiment, the whole lateral extension of the second and third walls 8, 10 could be provided with the thin layer 21 of a semi-conductive material.

Figure 4:
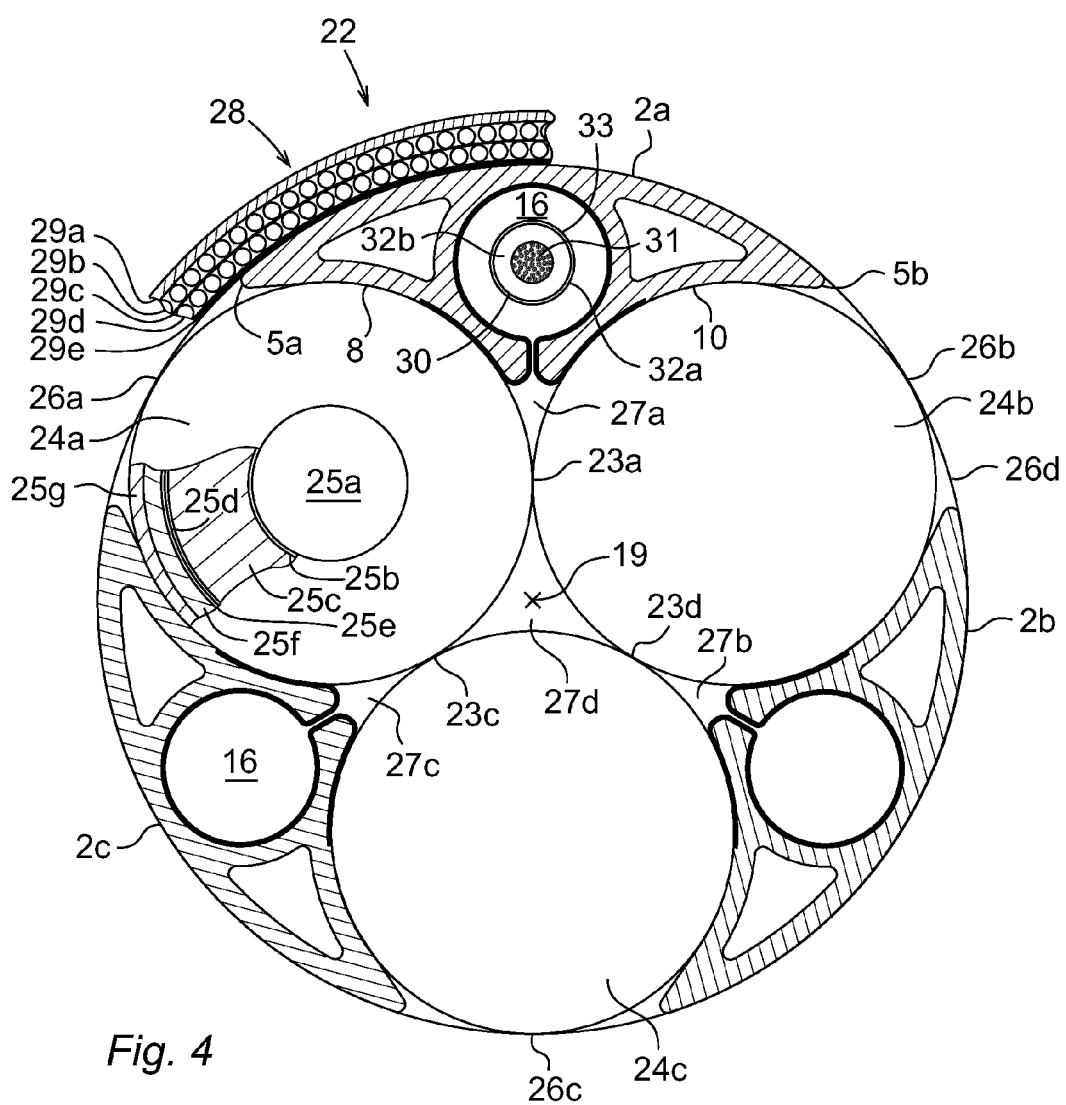
FIG. 4 is a cross-section of the interior of a power cable provided with the power cable assembly body shown in FIG. 3.

FIG. 4 shows the interior of a power cable 22 provided with three neighbouring first, second and third power cores 24a, 24b, 24c provided are built up in a manner corresponding to that of the embodiment of FIG. 2, and are thus each provided with a peripheral semi-conductive mantle 25g touching one another.

Also in this case, first, second and third assembly devices 2a, 2b, 2c are arranged in the peripheral spaces between the first, second and third power cores 24a, 24b, 24c, respectively.

A fibre optic cable 30 is put inside the chamber 16 of assembly device 2a.

According to this embodiment, the thin layer 21 of semi-conductive layer of the thickness range presented above extends from the second wall 8, to the first curved transition 13a, continuing via the first radial transition 14a to and around the annular wall 18 and further to the second radial transition 14b and continuing via the second radial transition 13b to the third wall 10. Thus, a contact to the thin layer 21 of semi-conductive material will be established disregarding which part of the annular wall 18 is contacted by the fibre optic cable 30. Contact is also established between the power cores 24a, 24b via the peripheral semi-conductive mantle 25g of each power core and the thin layer 21 of semi-conductive layer of the second and third walls 8, 10, and furthermore via the contact point 23a.

In this manner, and as already explained above in connection with FIGS. 1 and 2, the risk for a building up of an electric potential between the fibre optic cable 30 and the power cores 24a and/or 24b is avoided.

Again, this relates correspondingly to the case when a fibre optic cable is put inside the chamber of the assembly bodies 2b and/or 2c.

It is to be understood that the power cable assembly device of FIG. 1 could be provided with a slit 15 of the kind shown and described in connection with FIG. 3.

Furthermore, it is to be understood that the power cable assembly device of FIG. 3 could be provided with a slit 15 of the kind shown and described in connection with FIG. 1.

Figure 5A:
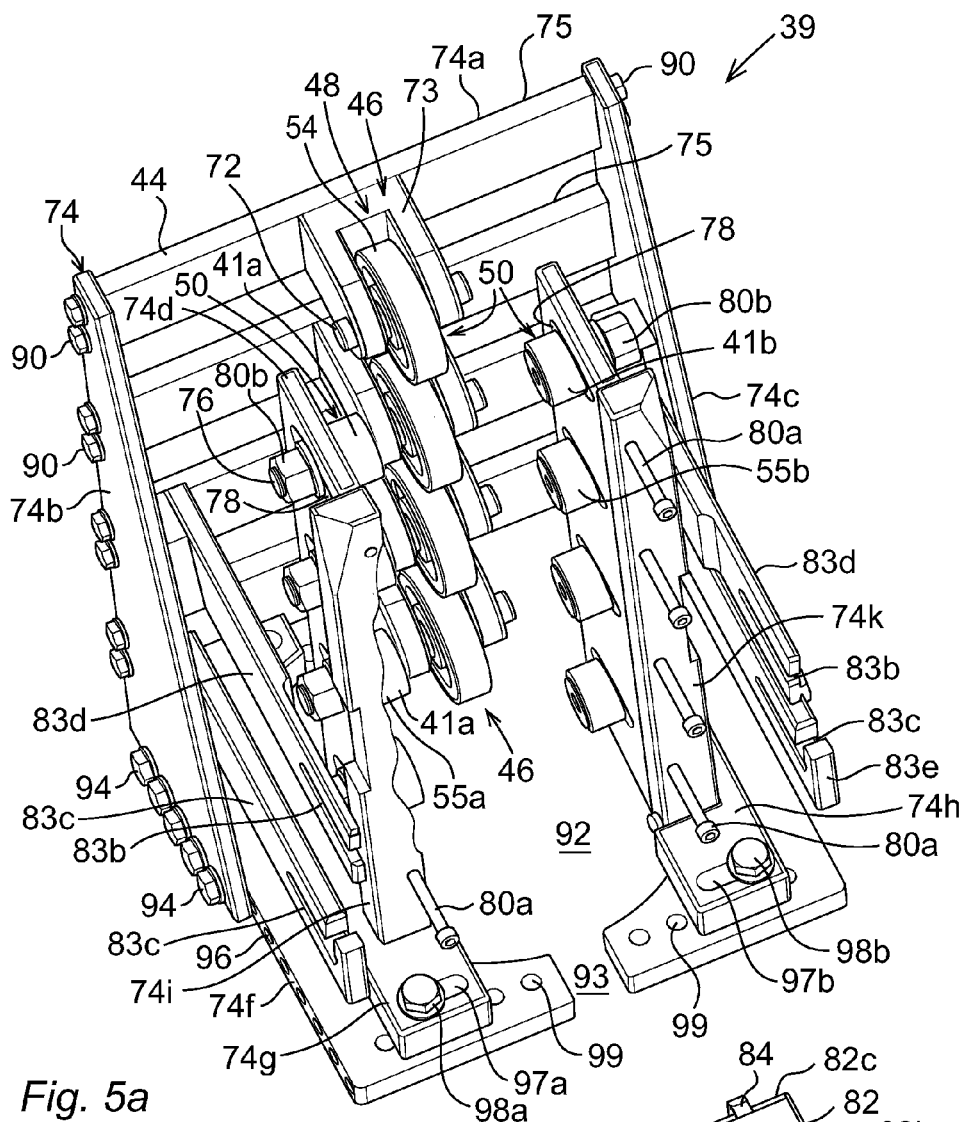
FIGS. 5a-5d illustrate a tool for introduction of a fibre optic cable in a power cable assembly device shown in FIGS. 1 and 3.

FIG. 5a shows a further variant of the tool 39 provided with support means 46 comprising four support members 48 in the form of double encapsulated ball-bearings 54. Each ball-bearing 54 is rotatably connected via an axle 72 to a U-shaped bearing support 73 across an axis through the aligned ball-bearings 54. The tool 39 is furthermore provided with guide means in the form of four pairs of guide wheels 41a, 41b of encapsulated needle bearings 55a, 55b, each rotatable about an axle 76, said axle 76 being parallel to the axles 72 of the ball-bearings 54.

In order to position the four ball-bearings 54 in relation to one another and in relation to the guide wheels, the tool 39 comprises a grid of parallel plates 75 of a first frame part 74a of an interconnection means 44 in the form of a frame 74, together forming a grid. Of course, the grid of parallel plates 75 could instead be constituted by a single plate.

The frame further comprises a pair of side walls 74b, 74c, connected perpendicularly to the first frame part 74a by screws 90. The side walls 74b, 74c are furthermore adjustably connected to a frame support 74f by screws 94 in a row of holes 96. In this manner, the first frame part 74a can be moved in a direction across the row of holes 96. Thus, the position of a plane through the axles 72 of the ball-bearings 54 can be adjusted in relation to the guide wheels 41a, 41b, depending on the thickness of the profiled body 4.

The frame support 74f is provided with an entrance opening 92 for introduction of the profiled body 4 into the tool 39. An access slot 93 in the frame support 74e allows for taking the tool 39 apart even if the profiled body 4 is still inside the tool 39.

The frame 74 further comprises a pair of plates 74d, 74e each connected to extension plates 74g, 74h. The plates 74d, 74e are each provided with a slot 97a, 97b in their opposing ends (the rear ends being hidden) for adjustable connection with screws 98a, 98b to a pair of rows of holes 99 in the frame support 74f. Hereby, the frame 74 is adjusted for the lateral dimension of the profiled body 4.

A pair of reinforcement members 74i, 74k are each provided with four sets of screws 80a. Each guide wheel 41a, 41b is independently movable in a slot 78 in the plates 74d, 74e towards a plane through the axles 72 of the ball-bearings 54, and is adjustable in the slot 78 by means of a corresponding set screw 80a. After performed adjustment, the position of the guide wheel 41a or 41b is fixed by means of a lock nut 80b.

The set of screws 80a and lock nuts 80b are adjusted in such a way that each guide wheel 41a, 41b is positioned at a predetermined distance relative to the support member 48. In this way, it is possible to adjust each pairs of guide wheels 41a, 41b relative to the other pairs of guide wheels 41a, 41b to bear against the edges of 5a, 5b of the profiled body 4. By said adjustment, the slit 15 will be widened and thus opened at a predetermined position between the first pair of wheels and the fourth pair of wheels.

Figure 5B:
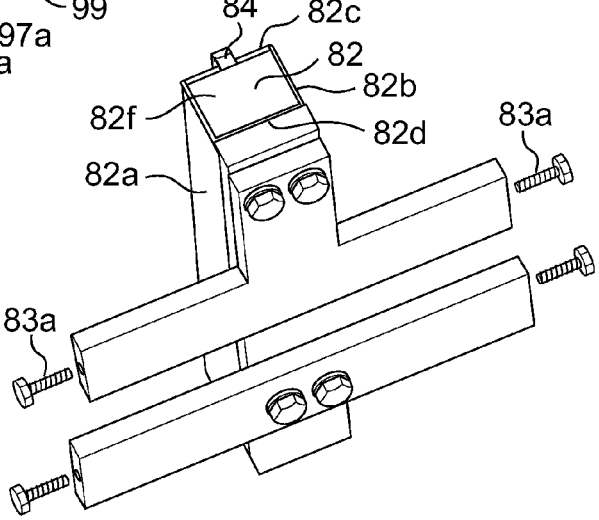

In FIG. 5b is shown an elongated guide beam 82 having lateral sides 82a, 82b, a guide side 82c and a connection side 82d (hidden). The guide beam 82 is to be arranged opposite to and facing the support members 48. The guide beam 82 is provided with an elongated guide member 84 to be positioned parallel to a plane through the axles 72 of the ball-bearings 54, by screws 83a in elongated slits 83b, 83c in two pairs of arms 83d, 83e connected to the side walls 74b, 74c of the frame 74.

Figure 5C:
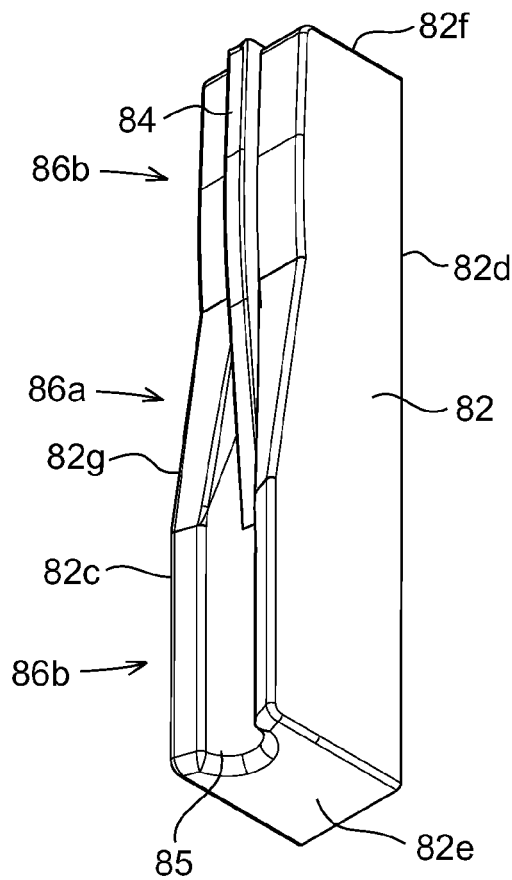

In FIG. 5c is shown the guide beam 82 from the opposite direction. At a first end 82e of the guide beam, an elongated U-shaped guide member 85 is provided, while at a second end 82f, and on the same longitudinal side 82c, an elongated guide member 84 is provided. Between the elongated guide, the U-shaped member 85 and the elongated guide member 84, a transition section 86a is provided between first and second sections 86b, 86c. In the transition section 86a, the lateral extension of the elongated U-shaped member 85, measured from the connection side 82d is reduced in a longitudinal direction from the first section 86b towards the elongated guide member 84. Furthermore, in the transition section 86a the lateral extension of the elongated member 84, measured from the connection side 82d is reduced in a longitudinal direction from the second section 86c towards the U-shaped member 85.

Figure 5D:
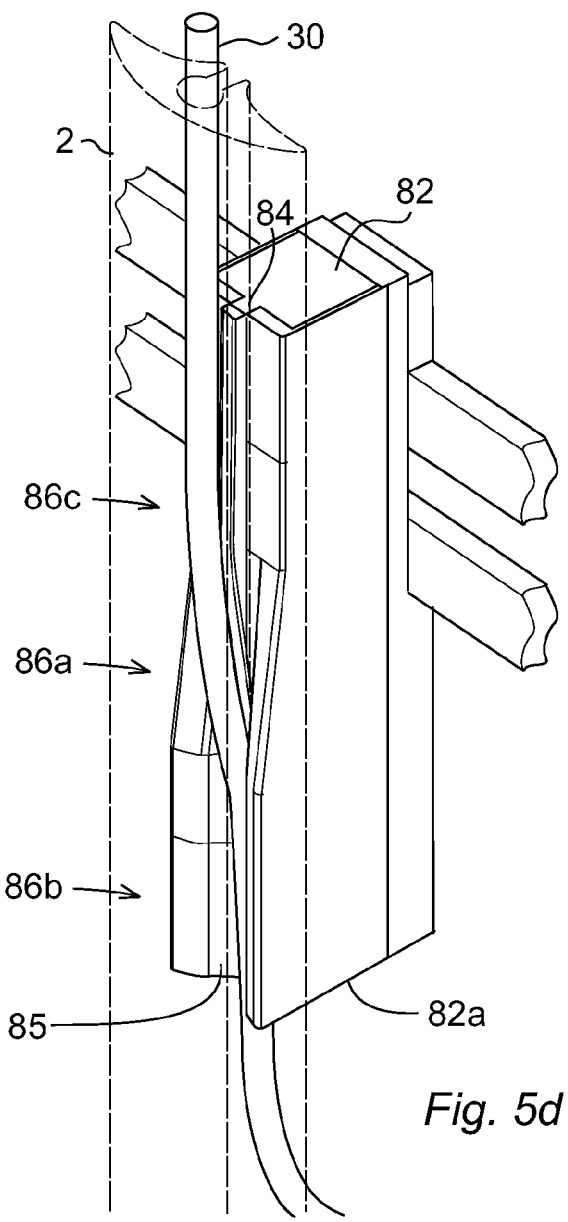

In FIG. 5d is shown that the fibre optic cable 30 is controlled to keep a longitudinal orientation relative to the slit 15 of the profiled body by the U-shaped guide member 85 at the first section 86b extending from the first end 82e to the transition section 86a. It also shows that the fibre optic cable is introduced into the profiled body 4 via slit 15 by the transition section 86a of the diminishing elongated U-shaped guide member 85 and the raising elongated guide member 84, and that the fibre optic cable 30 is guided to stay inside the chamber by the elongated guide member 84 in the section 86c extending from the transition section 86a towards the second end 82f.

Figure 6:
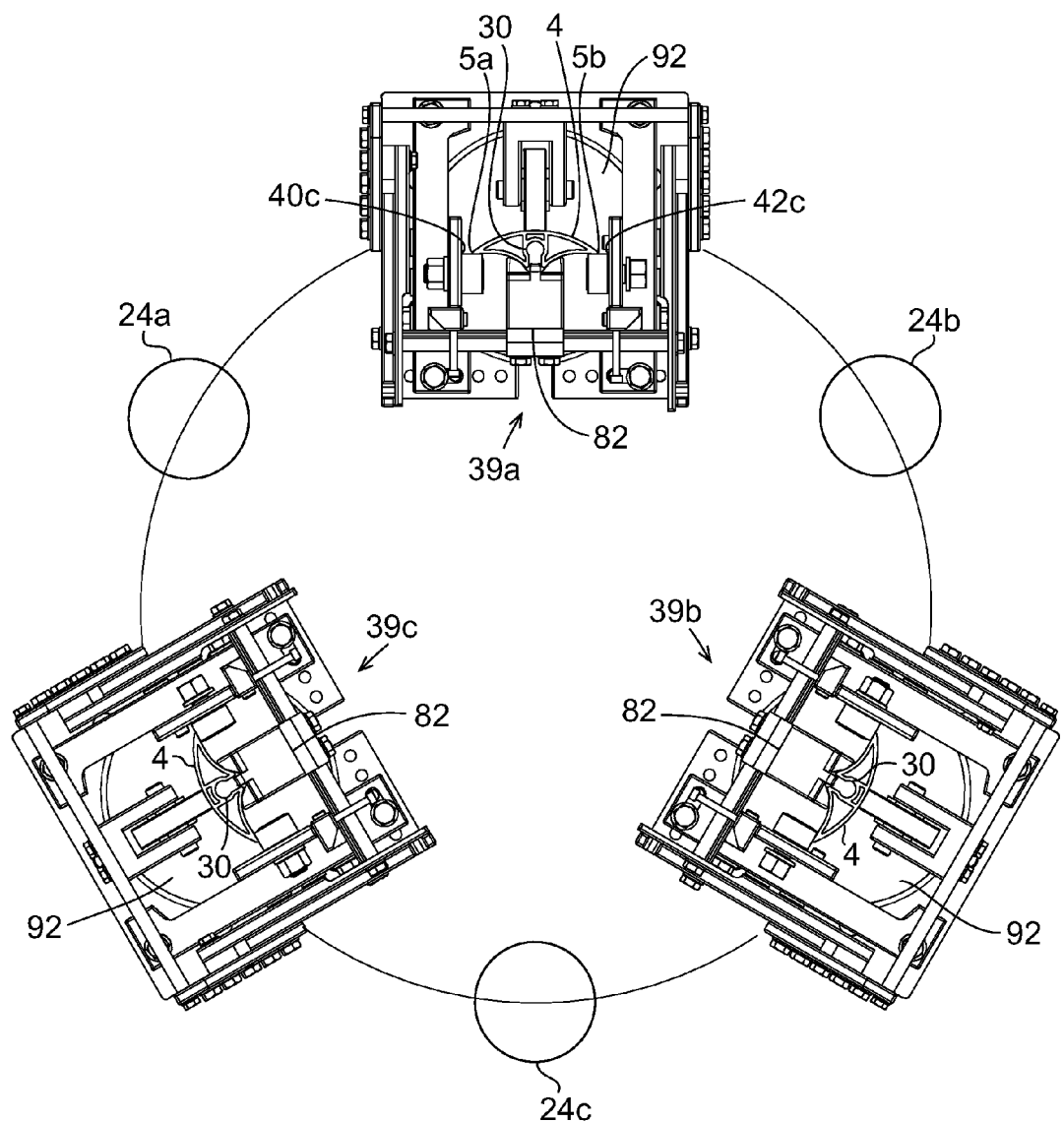
FIG. 6 illustrates a set up of tools in the assembly of a power cable.

FIG. 6 shows the first step of assembly of the power cable.

First, the power cores 24a, 24b, 24c are held 120° in relation to one another by means of not shown equipment in the periphery of an imaginary circle 100.

Then, between the power cores 24a, 24b, 24c three tools 39a, 39b, 39c of the kind shown in FIGS. 5a-d, are arranged 120° in relation to one another in the periphery of the imaginary circle 100 in relation to and between the power cores 24a, 24b, 24c.

As explained above in connection with FIG. 5a, the frame 74 is adjusted for the power cable assembly device 2 to be used, i.e. first frame part 74a is mounted in predetermined holes of the frame support 74f, and the pair of plates 74d, 74e are mounted in predetermined holes 99.

In each tool 39a, 39b, 39c, a profiled body 4 is positioned between the four pairs of guide wheels 41a, 41b, starting from the level of frame support 74f (i.e. seen from the lower part in FIG. 5a) and the four support members 48.

The screws 80a of the first, second and third pairs of wheels 41a, 41b, counted from the frame support 74f, are adjusted such that the slit 15 of the profiled body 4 of FIG. 1 or FIG. 3 is opened somewhat more than the diameter of the fibre optic cable 30, while the fourth pair of wheels 41a, 41*b* are adjusted to allow the slit 15 to be smaller, such that the width of the slit is less than the diameter of the fibre optic cable 30, but wider than the transversal dimension of the guide member 84.

A fibre optic cable 30 is now introduced via the entrance opening 92 of the frame 74 (cf. FIG. 5) in each profiled body 30 mounted in the tools 39*a*, 39*b*, 39*c*, and is introduced into the chamber 16 and through the end of the profiled body 4 and temporarily fixed inside the profiled body upon start.

A guide beam 82 of the kind described above is then mounted.

Each profiled body 4 is collected together with the power cores 24*a*, 24*b*, 24*c* at a distance from the tools 39*a*, 39*b*, 39*c* (above the tools as seen in FIG. 5*a* and FIG. 6) and are assembled while pulling the profiled bodies 4 and power cores 24*a*, 24*b*, 24*c* away from the tools 39*a*, 39*b*, 39*c*.

During this movement, the slit 15 is opened by the support members 48 and the guide members 41, while fibre optic cables 30 are guided into the chamber by the guide beam 82.

It should also be noted that the tools 39*a*, 39*b*, 39*c* may be mounted for introduction of the fibre optic cable 30 through the entrance opening 92 of the frame 74 horizontally or vertically.

In case of high torsional stiffness of the profiled body 4, a higher pressure may have to be applied on one side 8 than the other 10 by the guide wheels 41*a*, 41*b*, or a pressure may even only be applied on one side 8 by one or more guide wheels 41 a, while a lower or even no pressure may be applied on the other side 10 by one or more guide wheels 41*b*.

In FIG. 11, the simultaneous introduction of a fibre optic cable 30 into three power cable assembly devices 2 of a power cable 22. However, in case only one or two fibre optic cables 30 are to be introduced into the power cable, the tools 39*a*, 39*b*, 39*c* will still be used as guide tools for the assembly of the cores 24*a*, 24*b*, 24*c* and the power cable assembly devices. The support members 48 and guide wheels 41*a*, 41*b* of the tool or tools used only as guide tools will then preferably be adjusted in such a way that the slit of such profiled bodies 4 will not be opened.

It should be noted that the guide beam 82 could instead be divided into three different items, corresponding to the sections 86*a*, 86*b* and 86*c*. Alternatively, the first and second sections 86*b*, 86*c* could instead be a pair of wheels with a peripheral shape corresponding to the cross-section of the first and second sections 86*b*, 86*c*, respectively.

It should be noted that the encapsulated ball-bearing 54 could be exchanged to an encapsulated roller bearing, having circular cylindrical rollers, or to plain bearings.

Likewise, the encapsulated needle-bearings could be exchanged to small ball-bearings or plain bearings. Of course the bearings could also be non-encapsulated.

The invention claimed is:

1. A power cable assembly device adapted to be arranged in the spaces between neighbouring power cores of a power cable, comprising:
    an extruded profiled body made of a polymer material and adapted to the cross-sectional shape and elongation of the power cable, said profiled body comprising a chamber and defining a slit to said chamber, said chamber being adapted to receive a fibre optic cable via said slit,
    wherein substantially the whole surface of the profiled body inside the chamber, the surface of the profiled body defining the slit, and the surface of at least a region outside the profiled body extending from the slit and away from the slit is provided with a layer of semi-conductive material.

2. The power cable assembly device according to claim 1, wherein:
    the cross-section of the profiled body includes a first wall, a second wall and a third wall,
    said first wall being convex and having first and second opposite end portions,
    said second wall being concave and having third and fourth opposite end portions,
    said third wall being concave and having fifth and sixth end portions,
    the third end portion of said second wall being connected to said first end portion of said first wall,
    the fifth end portion of said third wall being connected to said second end portion of the first wall,
    the first wall being adapted to face a jacket of the power cable,
    said second wall and said third wall being adapted to face a pair of neighbouring power cores, and
    the fourth end portion of the second wall and the sixth end portion of the third wall define together a slit to a chamber inside said profiled body, said slit extending in the elongation of the profile for allowing introduction of a fibre optic cable into said chamber.

3. The power cable assembly device according to claim 1, wherein the cross-section of the chamber is substantially circular.

4. The power cable assembly device according to claim 1, wherein the semi-conductive material of the layer comprises a mixture of a polymer material and an additive.

5. The power cable assembly device according to claim 4, wherein the polymer material of the profiled body and the polymer material of the semi-conductive layer is chosen from PVC and PE.

6. The power cable assembly device according to claim 1, wherein the thickness of said layer is in the range 0.01-0.5 mm.

7. The power cable assembly device according to claim 1, wherein said elongated slit is closed in an assembled state.

8. The power cable assembly device according to claim 6, wherein the diameter of the chamber is in the range 11-25 mm.

9. The power cable assembly device according to claim 2, wherein the distance between the fourth end portion of the second wall and the sixth end portion of the third wall defining the slit is in the range 1 mm-13 mm.

10. The power cable assembly device according to claim 1, wherein the diameter of the chamber is in the range 11-25 mm.

11. The power cable assembly device according to claim 2, wherein the wall thickness of either or all of the second wall, the third wall and a wall defining the chamber has a thickness in the range of 2-6 mm.

12. The power cable assembly device according to claim 2, wherein the concavity of the outer surface of the second wall and the third wall, respectively, is adapted to the number of power cores and the diameter of the power cores.

13. The power cable assembly device according to claim 2, wherein the convexity of the outer surface of the first wall is adapted to an imaginary circle between a peripheral point of each power core in relation to the diametrical centre point of the power cable.

14. A power cable comprising a plurality of power cable assembly devices according to claim 1, said power cable assembly devices being arranged in the spaces between neighbouring power cores, at least one of said power cable assembly devices containing a fibre optic cable introduced via said slit.

15. The power cable according to claim 14, wherein:
the cross-section of the profiled body includes a first wall, a second wall and a third wall,
the first wall faces a jacket of the power cable,
the second wall and the third wall face a pair of neighbouring power cores, and
at least one of said assembly devices containing said fibre optic cable.

16. The power cable according to claim 15, wherein the second wall and the third wall are concave, and the concavity of the second wall and the third wall, respectively, is adapted to the number of power cores and the diameter of the power cores.

17. The power cable according to claim 15, wherein the first wall is convex, and the convexity of the first wall is adapted to an imaginary circle between a peripheral point of each power core in relation to the diametrical centre point of the power cable.

18. The power cable according to claim 14, wherein the number of power cores is three and the number of power cable assembly devices is three, and wherein the diameter of each power core is in the range 40-140 mm.

19. The power cable assembly device according to claim 2, wherein the cross-section of the chamber is substantially circular.

20. The power cable assembly device according to claim 2, wherein the semi-conductive material of the layer comprises a mixture of a polymer material and an additive.

* * * * *